United States Patent [19]

Walters

[11] Patent Number: 4,726,598
[45] Date of Patent: Feb. 23, 1988

[54] APPARATUS FOR INCREASING THE VERTICAL TRAVEL OF AUXILIARY WHEELS MOUNTED ON A VEHICLE

[76] Inventor: David Walters, P.O. Box 390, Rexburg, Id. 83440

[21] Appl. No.: 18,925

[22] Filed: Feb. 25, 1987

[51] Int. Cl.$^4$ .................... B60G 17/00; B62D 61/12
[52] U.S. Cl. ................... 280/81 R; 180/24.02; 180/209; 280/405 R
[58] Field of Search .............. 180/209, 24.02; 280/81 R, 81 A, 43.23, 405, 405 R

[56] References Cited

U.S. PATENT DOCUMENTS

| | | | |
|---|---|---|---|
| 3,191,963 | 6/1965 | Prichard | 280/81 R |
| 4,146,243 | 3/1979 | Sims | 280/81 R |
| 4,314,709 | 2/1982 | Silbernagel | 280/81 A |

OTHER PUBLICATIONS

Advertisement for Lange's Hi-Steer Hi-Lift Plus Steering for Lange's Welding.
Advertisement brochure for Turner Air Suspensions for Turner Quick-Lift Corporation.
Advertisement for Ridewell Universal Air-Ride Model 220 for Ridewell Corporation.
Advertisement for Hi-Steer Suspension Tag and Pusher Axles for Maximum Payload for Challenge-Cook Bros., Inc.
Advertisement for Pusher-Type Air Suspension for Granning Suspensions, Inc., 1980.
Advertisement for Granning Air Lift Systems for Granning Suspensions, Inc. and Granning Suspensions, Ltd.

*Primary Examiner*—Richard A. Bertsch
*Attorney, Agent, or Firm*—Robert R. Mallinckrodt; Philip A. Mallinckrodt

[57] ABSTRACT

An apparatus for increasing the vertical travel of auxiliary wheels mounted on an auxiliary axle includes a lever rotatably mounted on the auxiliary axle and a wheel mounting spindle secured to the lever spaced from its mounting on the auxiliary axle to displace the wheel from the axle. In a preferred form of the invention, the lever is mounted on the axle by being secured to the end of a second axle rotatably mounted within the hollow auxiliary axle. Apparatus is provided to cause rotation of the lever between a lowered position in which the auxiliary wheels can be moved into weight bearing position and a raised, increased clearance position. A lock is provided so the lever can be locked in position, at least when in lowered position. In some cases, the lever will be mounted to the axle in a manner to allow the auxiliary wheel to caster and thereby steer with the vehicle on which it is mounted.

14 Claims, 8 Drawing Figures

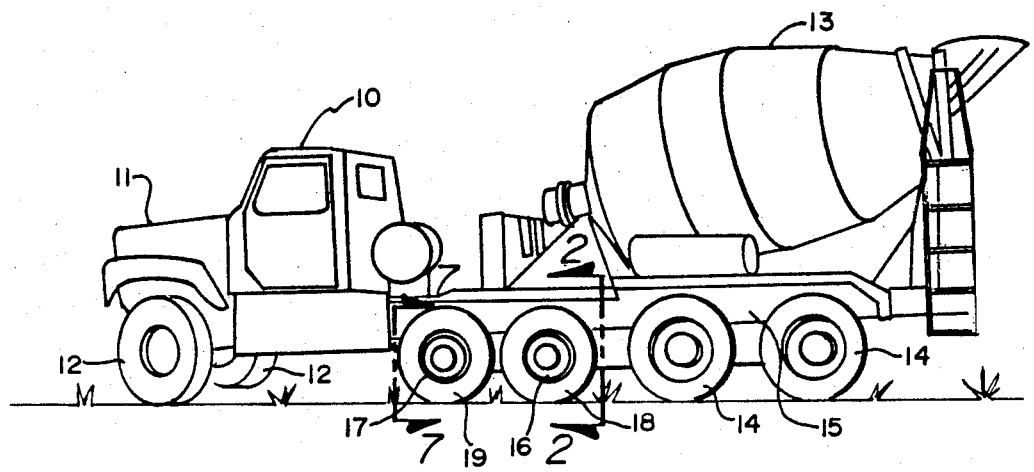
FIG.
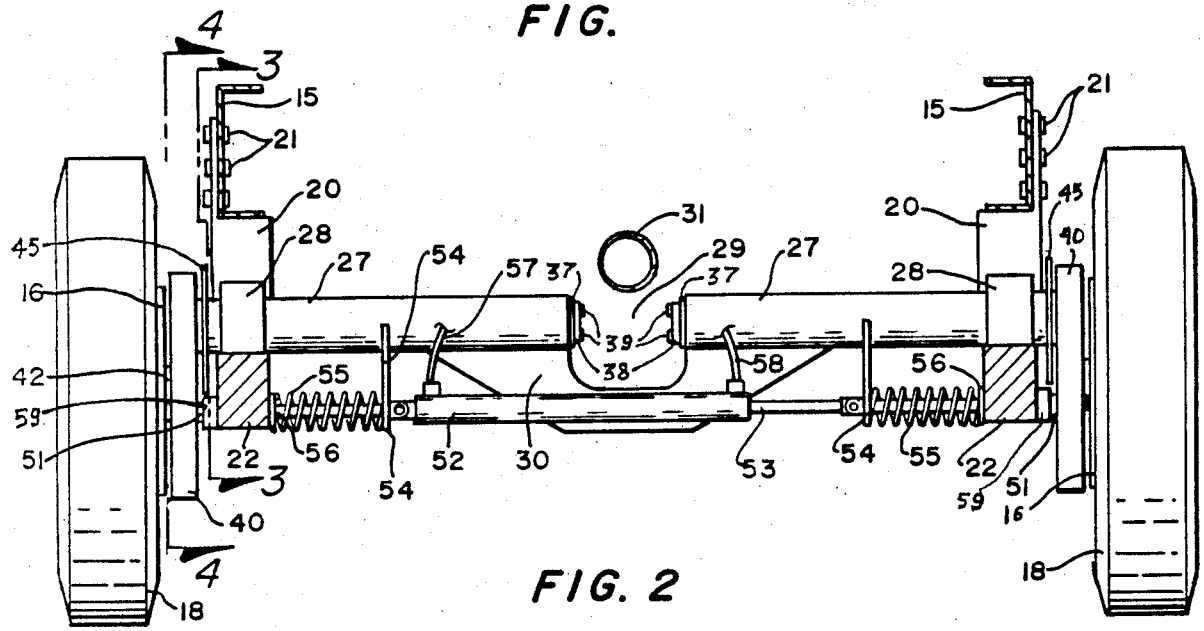
FIG. 2
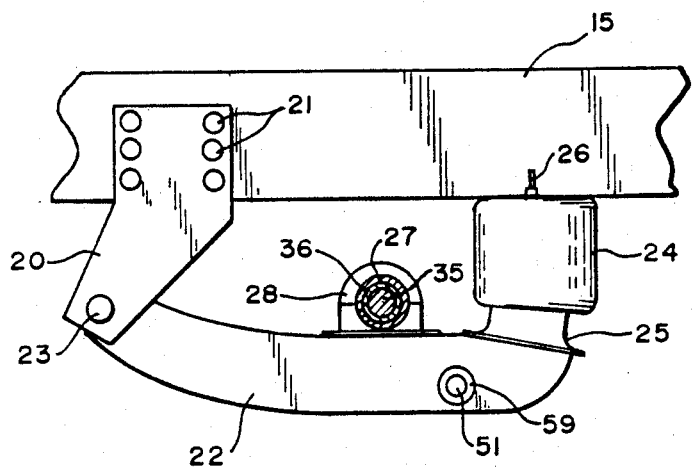
FIG. 3

APPARATUS FOR INCREASING THE VERTICAL TRAVEL OF AUXILIARY WHEELS MOUNTED ON A VEHICLE

BACKGROUND OF THE INVENTION

Field

The invention is in the field of auxiliary axles and wheels used on trucks and other heavy equipment wherein the axles and wheels may be lowered into load bearing position when necessary to spread the load of the vehicle over more wheels and can be raised when not needed.

STATE OF THE ART

With various states now adopting stricter highway weight restrictions and with the federal government imposing stricter weight requirements for federal highways and highway bridges, it has become necessary to either add extra weight carrying axles and wheels to various heavy load hauling trucks such as ready mix concrete trucks, or to decrease the payload of such trucks.

Various auxiliary axle assemblies are currently available for mounting extra wheels on trucks and most of these asemblies provide an axle with wheels mounted on opposite ends thereof. The axle is mounted to the truck frame in a manner so that it can be raised or lowered using an air bellows, generally operable from inside the truck cab. In this manner, the auxilary axle can be lowered and the wheels placed in load bearing position when the truck is loaded and the additional wheels are needed to spread the weight of the load for highway travel and the axle can be raised to thereby lift the wheels off the ground when the truck is not loaded and the wheels are not needed.

Many trucks which use auxiliary wheels, such as concrete trucks, are used in construction work and travel off the road through rough terrain in order to deliver their load to the desired construction site. Most auxiliary axles are limited in the distance they move up and down and therefore in the clearance they provide between the auxiliary wheels and the ground. Most auxiliary axles can provide only several inches clearance with one or two models offering up to about ten or twelve inches clearance. This is not a problem on normal roads, but since many times auxiliary wheels are mounted between the front wheels of a truck and the driving wheels, the truck can get hung up on such wheels when traveling over rough construction sites. The clearance provided by currently available auxiliary axles is generally not enough for many construction sites.

SUMMARY OF THE INVENTION

According to the invention, an apparatus for increasing the vertical travel of auxiliary wheels mounted on an auxiliary axle includes a lever mounted at the ends of the auxiliary axle and extending generally in a plane perpendicular to that of the auxiliary axle. Wheel mounting spindles are rotatably secured to the levers spaced outwardly from the mounting axle to thereby offset the wheels from ends of the auxiliary axle. Means are provided for locking the lever means and mounting axle in a down position wherein tires mounted on the wheels on the spindles are adapted to be moved into contact with the surface upon which the vehicle is resting when the auxiliary axle is moved to its down, weight bearing position, and means are provided for rotating the lever means about the auxiliary axle into a rotated, raised position when additional wheel clearance is desired. In a preferred form of the invention, a lever mounting axle is rotatably secured within the usual tubular auxiliary axle and the lever is secured to the mounting axle.

The apparatus of the invention may be used with most existing auxiliary axles and in normal use the lever will remain in its locked, down position, the wheels being raised and lowered in normal fashion by raising and lowering the auxiliary axle. When additional clearance of the auxiliary wheels is needed for rough terrain, the levers are rotated to move the auxiliary wheels to raised position for increased clearance.

Most auxiliary axles used today when used between the normal front and rear wheels of a truck are split axles with a drop center portion which fits about the drive shaft of the vehicle when the auxiliary axle is in its raised position. When used with such axles, the mounting axle of the apparatus is also split into two parts to form a pair of axles, respective axles of the pair being mounted in respective tubular portions of the split auxiliary axle. Each mounting axle of the pair is secured within the respective auxiliary axle portions.

In many instances, several auxiliary axles will be needed on heavy vehicles in order to meet weight specifications. Where auxiliary wheels are located in front of the normal drive wheels by up to about four feet, no special steering system is needed. However, where the auxiliary wheels are located further ahead of the normal wheels than about four feet, as will be the case with a second auxiliary axle which usually requires an additional four feet making the second set of auxiliary wheels eight feet ahead of the normal rear wheels, steerable auxiliary wheels are needed in order to avoid excessive tire wear due to scuffing of the tires. With the present apparatus the levers may be pivotally mounted on the end of the mounting axle so that in weight bearing position the levers with auxiliary wheels mounted thereon are free to caster as the vehicle turns. Means are provided to lock the pivot mounting when the levers are rotated to up position to thereby hold the levers and wheels from pivoting downwardly and outwardly when in up position.

THE DRAWINGS

In the accompanying drawings, which illustrate the best mode presently contemplated for carrying out the invention:

FIG. 1 is a pictorial view of a ready mix concrete truck having two sets of auxiliary wheels mounted thereon between the normal back and front wheels;

FIG. 2, a fragmentary vertical section taken on the line 2—3 of FIG. 1, showing the rearmost auxiliary axle in vertical elevation and its attachment to the truck frame, but not showing other portions of the truck;

FIG. 3, a fragmentary vertical section taken on the line 3—3 of FIG. 2;

FIG. 4, a fragmentary vertical section taken on the line 4—4 of FIG. 2;

FIG. 5, a fragmentary vertical section taken on the line 5—5 of FIG. 4;

FIG. 6, a section through an axle similar to that shown in FIG. 5, but showing an embodiment having a straight axle without the drop section in the middle of the axle;

FIG. 7, a fragmentary vertical section taken on the line 7—7 of FIG. 1 and showing in elevation one end of the forwardmost auxiliary axle which is steerable; and FIG. 8, a fragmentary top plan view of the steerable wheel arrangement of FIG. 7, taken on the line 8—8 of FIG. 7.

DETAILED DESCRIPTION OF THE ILLUSTRATED EMBODIMENT

Figure 4:
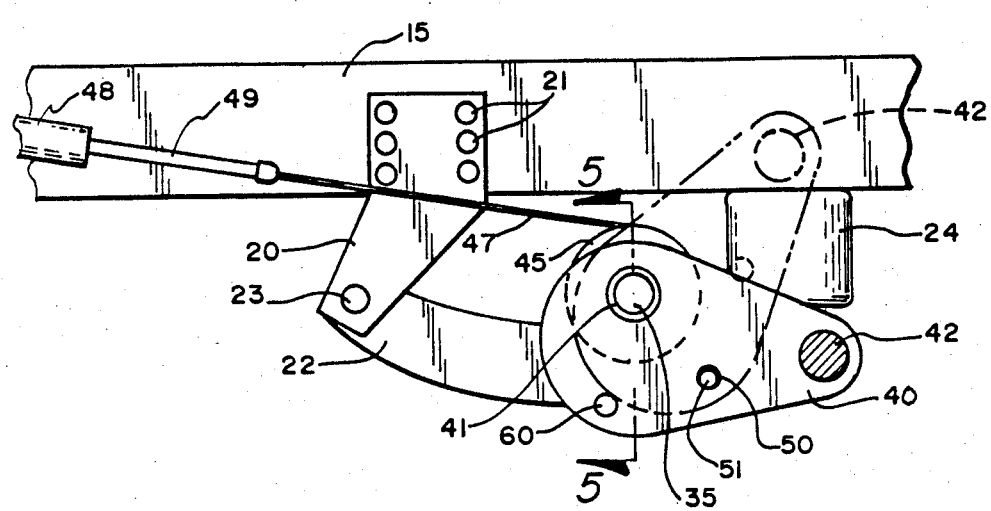

FIG. 1 shows a ready mix concrete truck with cab 10, engine compartment 11 located over a front axle having front wheels with tires 12 mounted thereon, and a concrete holding and mixing barrel 13 mounted over a pair of rear axles with rear wheels and tires 14 mounted thereon. The front axle and pair of rear axles are mounted on the truck frame in normal manner. The frame generally includes two parallel steel channels 15 as shown in FIG. 2.

It has become common practice recently to add additional or auxiliary axles to a truck of this type between the front wheels 12 and rear wheels 14 to provide additional auxiliary wheels 16 and 17 with tires 18 and 19 mounted thereon which can be lowered into a weight bearing position to distribute the weight of the truck over the additional tires so as to meet federal and state wheel weight loading limitations when the truck is loaded. These auxiliary wheels can generally be raised to some degree to a non weight bearing position, when desired, such as when the truck is unloaded.

The auxiliary axles are generally independently mounted to the frame for up and down movement between weight bearing and non-weight bearing positions. As shown in FIGS. 2 and 3, mounting brackets 20 are secured to opposite frame members 15 such as by bolts 21 and extend downwardly therefrom. Each mounting bracket 20 has an axle support bracket 22 pivotally mounted thereto by a bolt 23 passing therethrough. Each axle support bracket 22 has an air bellows 24 secured at its lower end 25 to the end of the axle support bracket 22 opposite its pivotal mounting to bracket 20. The air bellows 24 is positioned between bracket 22 and frame 15 as shown with its upper end secured to the underside of frame 15. The air bellows operate in normal manner with compressed air from any suitable source supplied to the bellows through air supply line 26 causing the bellows to expand longitudinally and bracket 22 to rotate downwardly about pivot axis 23. Upon release of the compressed air, the bellows 24 contracts and bracket 22 rotates upwardly about pivot 23.

An auxiliary axle 27 is secured to bracket 22 by pillow blocks 28. Thus, as bracket 22 rotates downwardly about pivot 23, axle 27 and the wheels 16 and tires 18 mounted thereon, move downwardly. As bracket 22 rotates upwardly about pivot 23, axle 27 and the wheels 16 and tires 18 mounted thereon move upwardly. Where the auxiliary axles are used, as shown here, ahead of the normal rear wheels, the axle 27 will normally have a drop section 29 in the center thereof formed by joining two axle sections by a plate 30. This provides room in drop section 29 for passage of the trucks drive shaft 31 when the axle is raised.

As described so far, the provision of the auxiliary axle, its configuration, and mounting for up and down movement is well known and does not form part of the present invention. With such presently known auxiliary axles, the wheels and tires are mounted to the ends of the axles. Axles and mounting structures as described are commercially available from a number of sources such as the Turner Quick-Lift Corporation of Canton, Ohio, or Granning Suspension, Inc. of Livonia, Mich. The problem with the system described so far is that the up and down movement of the axle is limited by the travel of the air bellows and by the clearance between the axle and the drive shaft and between the axle and the frame. Since the wheels and tires are mounted directly to the ends of the axles, the clearance between the tires and the ground is limited to the available amount of upward travel of the axle. In many cases, increased lift is needed for the auxiliary wheels mounted on the axle to give increased clearance between the wheels and the ground.

The present invention provides increased clearance for the wheels by providing lever mounting means for the wheels at either end of the axle which offset the mounting spindles for the wheels and the wheels from the axle and allow the mounting spindles and wheels to be rotated about the axle to provide increased wheel lift and ground clearance for the wheels, when desired, without increasing the vertical movement of the axle.

Figure 5:
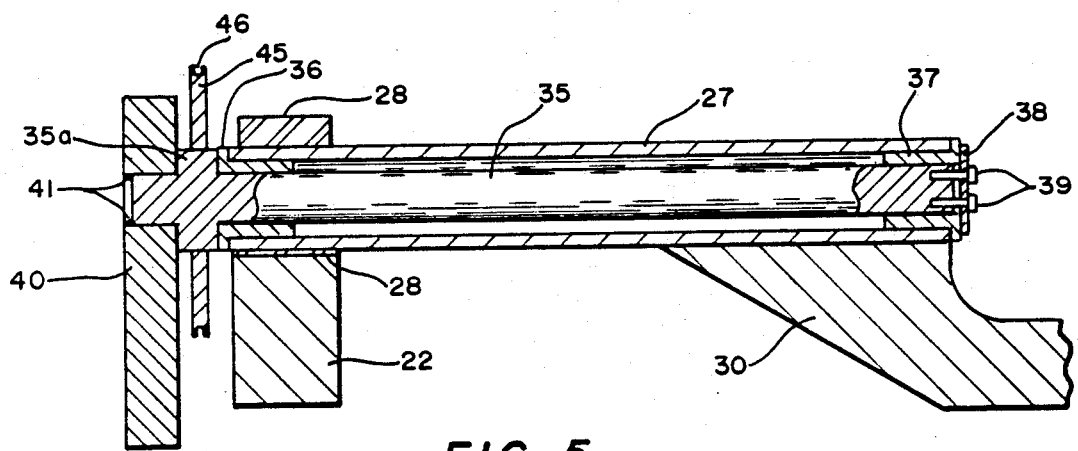

Referring to FIGS. 2-5, the axle sections 27 are tubular, as shown, and a second axle 35 is positioned for at least limited rotation within axle 27. Sleeves 36 and 37 act as bearings for axle 35. Axle 35 has an enlarged diameter portion 35a at the outer end of the axle 27 which forms a shoulder which abuts bearing sleeve 36 as shown in FIG. 5. Axle 35 is held in position in axle 27 by cap disc 38 secured to the inner end of axle 35 and against bearing sleeve 37 by screws 39. After enlarged portion 35a of axle 35, axle 35 narrows down again to its normal diameter at its outside end and one end of lever 40 is secured thereto such as by welding as shown at 41 in FIG. 5.

Lever 40 extends transversely backwardly from axle 35 as shown in FIG. 4 and has a wheel mounting spindle 42 secured, as by welding, at its other end. A wheel 16 and tire 18 is mounted on the spindle in normal manner.

A grooved disc 45 with groove 46, FIG. 5, is secured, such as by welding, to axle 35. A cable 47, FIG. 4, is wrapped about a portion of disc 45 in groove 46 with an end thereof secured to disc 45 in any suitable manner. The end of the cable 47 extending from disc 45 is attached to a means to pull cable 47 when it is desired to raise the wheel 16. Such means is shown as a pneumatic cylinder 48 and piston 49 which is operable by the truck operator. As the piston moves into the cylinder, it pulls cable 47 causing disc 45 to rotate. This cause axle 35 to rotate within axle 27 and causes lever 40 to rotate therewith and move from a down position as shown in solid lines in FIG. 4 to an up position as shown in broken lines in FIG. 4. As lever 40 moves to its up position, wheel mounting spindle 42 rises substantially, as shown, thus lifting wheel 16 and tire 18 for increased clearance. When the piston 49 is allowed to extend from cylinder 48, it allows lever 40 to rotate back to its solid line position shown in FIG. 4 and wheel mounting spindle 42 and wheel 16 with tire 18 mounted thereon to move to its lowered position. Various means could be employed to retract and extend cable 47. The amount of upward travel of wheel 16 and tire 18 depends upon the length of lever 40. The more offset mounting spindle 42 is from axle 35, the greter the upward travel of the wheel will be as the lever is rotated.

In order to have wheel 16 be a weight bearing wheel, wheel 16 has to be locked into its lowered position. For this purpose, each lever 40 has a locking hole 50, FIG.

4, provided therein to receive the end of an elongate locking pin 51 therethrough. As shown in FIG. 2, each locking pin 51 extends outwardly from an opposite end of a free floating pneumatic cylinder and piston assembly made up of cylinder 52 and piston 53. Supports 54 rigidly secured, such as by welding, to axle 27 slidably support the portions of pins 51 where they connect to the end of cylinder 52 and the end of piston 53. Springs 55 of approximately equal strength are compressed between washers 56 and supports 54. Washers 56 are rigidly secured to pins 51 inwardly of brackets 22 so that springs 55 bias pins 51 outwardly to a position, as shown in FIG. 2, wherein washers 56 rest against brackets 22 and piston 53 is extended from cylinder 52. In such position, pins 51 are in locking engagement through the pin receiving holes in levers 40. Thiw will be the default position of pins 51 when no air pressure is provided to cylinder 52 and also the position when positive extension of pins 51 is caused by supplying compressed air to cylinder 52 through hose 57 from a control, not shown. When it is desired to retract pins 51, piston 53 is retracted within cylinder 52 by supplying compressed air to the other end of cylinder 52 through hose 58 from a control, not shown. When piston 53 is retracted, the pins 51 will move inwardly an approximately equal distance due to the free floating nature of cylinder 52 and piston 53 and the approximately equal force exerted on each pin by springs 55. Pins 51 are retracted from holes 50 in levers 40 into bearing collars 59 mounted in brackets 22. Levers 40 and axle 35 are then free to rotate.

When levers 40 are in down position so that holes 50 line up with pins 51, the cylinder and piston assembly may be operated to extend piston 53 with respect to cylinder 52. Again, because of springs 55, each end of the assembly moves approximately equal distances outwardly and pins 51 move into holes 50 in levers 40. These pins then lock levers 40 in their down position. When locked in down position, levers 40 cannot rotate and as axle 27 is lowered by air bellows 24, wheels 16 with tires 18 are lowered to contact the ground and then weight is applied to tires 18 by pressurizing air bellows 24. The weight exerted on tires 18 depends upon the pressure of the air in air bellows 24. In this way, with levers 40 locked in down position, axle 27 is raised and lowered and weight is exerted on tires 18 in normal manner as if the invention was not present. Raising axle 27 in normal manner results in substantially the same clearance of wheels 16 and tires 18 as is normally obtained without the invention.

Figure 6:
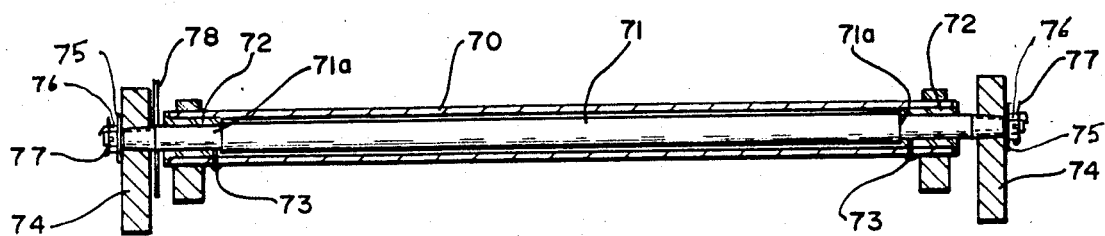

When increased clearance is desired, the auxiliary axle is raised in normal manner to take weight off tires 18 and lateral pressure off pins 51 from levers 40. Piston 53 is then retracted to withdraw pins 51 from locking holes 50 in levers 40 and cable 47 is then retracted by withdrawing pistons 49 into cylinders 48 thereby rotating discs 45 and levers 40 and raising wheels 16. While it is not necessary to do so because the wheels can be held in raised position merely by the operation of cylinder 48 and piston 49, it is preferred to provide a second hole 60 in each lever 40, which, when lever 40 is in raised position, assumes the same position with respect to pins 51 as hole 50 does in lowered position. Pins 51 may then be extended into holes 60 to lock levers 40 in raised position.

Where a drop axle is not required by the positioning of the auxiliary axle, rather than the axle being in two sections as described above, an arrangement as shown in FIG. 6 may be used. Thus, a hollow axle 70 will be mounted similarly as described above for axle 27, but does not have a drop portion at its center. A second axle 71 is positioned for at least limited rotation within axle 70 and is supported by bearing sleeves 72 at opposite ends of axle 70. Axle 71 is of reduced diameter at its ends which pass through bearing sleeves 72 to form shoulders 71a which bear laterally against bearing sleeves 72. Bearing sleeves 72 are held in axle 70 by set screws 73. The ends of axle 71 are provided with a taper on which levers 74 are secured in standard fashion by washers 75 and nuts 76. Nuts 76 may be locked in position by cotter pins 77 in standard automotive manner. A grooved disc 78, similar to disc 45, is secured to one end of axle 71 and is operated as described above to rotate axle 71 within axle 70 to raise and lower levers 74. Levers 74 may be locked in either raised or lowered position as described above. In the embodiment of FIG. 6, it is not necessary to have the disc and cable arrangement for rotating axle 71 and raising and lowering levers 74 on both ends of the axle since the axle extends completely through axle 70. Thus, rotation of axle 71 from one side results in simultaneous rotation of levers 74 mounted on each end of the axle.

Where an auxiliary axle is used more than four feet from the existing axles, steerable auxiliary wheels are desireable to prevent excessive wear on the auxiliary tires due to scuffing of the tires. Wheels 17 with tires 19 as shown in FIG. 1 are located in a position where steerable wheels are necessary. The axle mounting and operation is the same as that described for wheels 16, but the lever mounting provides for steerability as shown in FIGS. 7 and 8.

Figure 7:
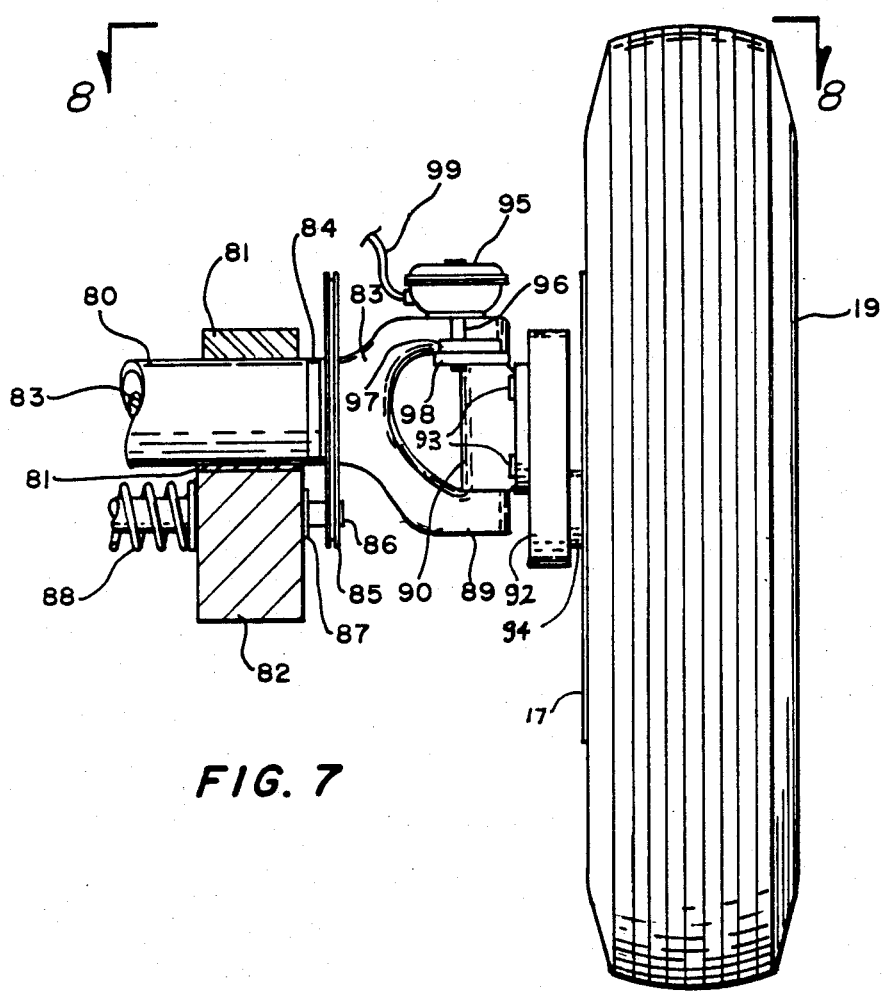
Figure 8:
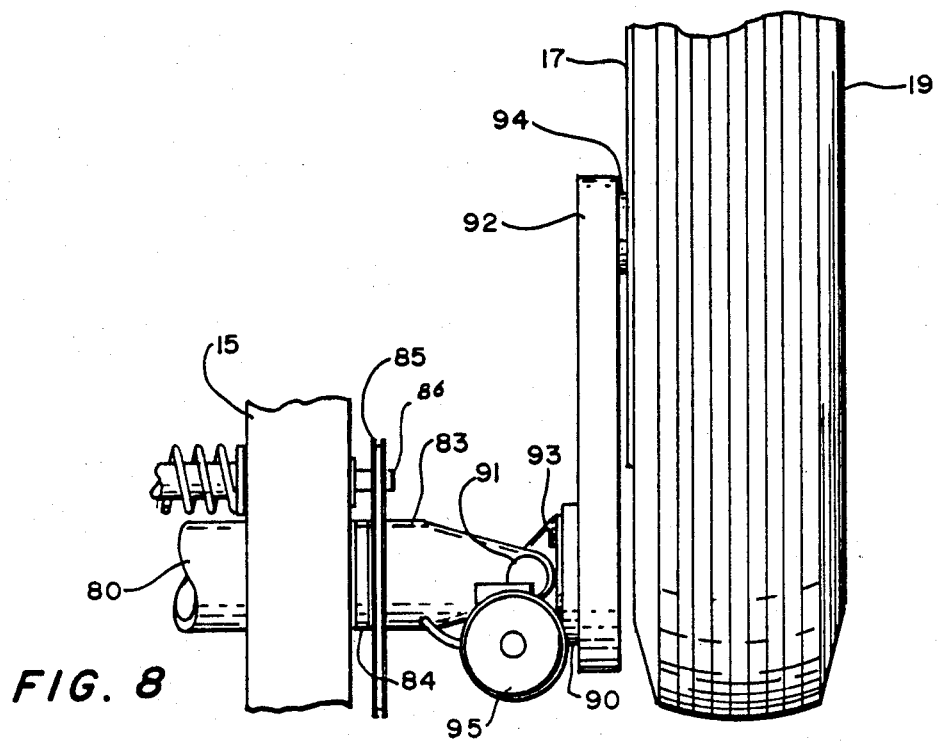

Referring to FIGS. 7 and 8, a hollow axle 80 is mounted by pillow blocks 81 to bracket 82. An inner axle 83 is secured to axle 80 and supported by bearing sleeve 84 and a grooved disc 85 is mounted on axle 83 as it extends from bearing sleeve 84. This is all as described and similarly shown in FIGS. 2-5. Also, a locking mechanism as described and shown in FIG. 2 is provided with pin 86 extending through bearing collar 87 in bracket 82 and extending through a receiving hole in disc 85 to lock it in position. A bias spring 88 is positioned similarly as in FIG. 2.

The difference in the embodiment of FIGS. 7 and 8 is that the outer end of axle 83 is formed into clevis portion 89 which pivotally mounts bracket 90 therein by means of vertical pin 91. Lever 92, similar to levers 40 previously described, is secured at one end to bracket 90, such as by bolts 93, and has a wheel mounting spindle 94 mounted at its other end. Wheel 17 and tire 19 are mounted on spindle 94. With the mounting as described, lever 92 and bracket 90 are free to rotate or caster about pivot pin 91. This means that wheel 17 and tire 19 will self steer as the truck on which it is mounted turns.

When axle 83 is rotated to rotate lever 92 and raise wheel 17 and tire 19 to provide additional tire clearance, the whole pivot mounting of lever 92 rotates also. In order to hold lever 92 in fixed position about pivot pin 91, an air operated diaphram assembly 95 is mounted on the upper portion of the clevis portion 89 of axle 83 and a locking pin 96 extending therefrom passes through a hole in bracket 97 mounted on clevis 89 and through a hole in locking plate 98 secured to bracket 90. This locks bracket 90 in position with respect to clevis pin 91 so that bracket 90 cannot rotate about pin 91. The operation of diaphram assembly 95 is such that when air pressure is supplied thereto through air line 99, pin 96 is lifted from the hole in locking plate 98 so that the bracket 90 is again free to rotate about pin 91. In this way, when bracket 90 is locked in position, it will remain locked with no air pressure supplied to diaphram unit 95 so remains locked when the truck is not in operation.

In the various embodiments shown, bearing sleeves are provided between the inner and outer axles. However, because the axles are subject to only limited relative rotation, such bearings are not necessary and the type of bearing used is not important.

While the levers on which the wheel mounting spindle are secured have been shown and described herein as rigidly attached to mounting axles which are rotatably mounted in hollow auxiliary axles, and such mounting is currently preferred because of its ease of installation and serviceability and because of the stability it provides for the wheels mounted thereon, the levers could be rotatably mounted on a fixed axle and rotated individually about the fixed axle. In such case, the means for rotating the lever is secured to the lever rather than to the axle as shown and described. Operation of the unit, however, would be substantially the same as that described.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

What is claimed is:

1. Apparatus for increasing the vertical travel of auxiliary wheels mounted on an auxiliary axle adapted to be mounted on the frame of a vehicle, and wherein the auxiliary axle is adapted to move between a lowered, weight bearing position, and a raised position, comprising lever means rotatably secured to the ends of said auxiliary axle and extending from the longitudinal axis of the auxiliary axle; wheel mounting spindles rotatably secured to the respective lever means and spaced outwardly along the lever means from the auxiliary axle and adapted to have wheels mounted thereon; means for locking the lever means in a down, weight bearing position wherein wheels mounted on the spindles are adapted to contact the surface upon which the vehicle is resting when the auxiliary axle is in its down, weight bearing position; and means for rotating the lever means about said auxiliary axle so as to raise the spindles and wheels mounted thereon with respect to the auxiliary axle when additional wheel clearance is desired.

2. Apparatus for increasing the vertical travel of auxiliary wheels mounted on an auxiliary axle according to claim 1, wherein the auxiliary axle is tubular, wherein a mounting axle is positioned for at least limited rotation within the auxiliary axle and extends from each end of the auxiliary axle, and wherein the lever means are rotatably mounted on the ends of the auxiliary axle by being secured to the ends of the mounting axle.

3. Apparatus for increasing the vertical travel of auxiliary wheels mounted on an auxiliary axle according to claim 2, wherein the auxiliary axle is a split axle having a pair of tubular axle sections joined by a drop section adapted to fit about the drive shaft of the vehicle when the auxiliary axle is in its raised position, wherein the mounting axle is a pair of axles, and wherein means are provided to secure each respective mounting axle of said pair rotatably within a respective tubular auxiliary axle section.

4. Apparatus for increasing the vertical travel of auxiliary wheels mounted on an auxiliary axle according to claim 3, wherein the means for rotating the lever means is means for rotating each of the pair of mounting axles.

5. Apparatus for increasing the vertical travel of auxiliary wheels mounted on an auxiliary axle according to claim 4, wherein the means for rotating each of the pair of mounting axles includes a disc mounted toward the outer end of each axle and means for rotating the discs to cause rotation of the axles.

6. Apparatus for increasing the vertical travel of auxiliary wheels mounted on an auxiliary axle according to clim 5, wherein the means for rotating each disc includes cable means wrapped partially about the disc and means for pulling the cable means to cause rotation of the disc.

7. Apparatus for increasing the vertical travel of auxiliary wheels mounted on an auxiliary axle according to claim 6, wherein the means for pulling the cable means is a cylinder and piston assembly.

8. Apparatus for increasing the vertical travel of auxiliary wheels mounted on an auxiliary axle according to claim 4, wherein the means for locking the lever means in a down position includes locking pins, receiving holes in the levers for said locking pins, and means for extending the locking pins into the receiving holes when it is desired to lock the levers in position whereby the pins prevent rotation of the levers, and for withdrawing the pins from the receiving holes when desired to release the levers and allow them to rotate.

9. Apparatus for increasing the vertical travel of auxiliary wheels mounted on an auxiliary axle according to claim 8, wherein an additional receiving hole is provided in each lever to receive the locking pins therein when the levers are in a raised position to thereby lock the levers in raised position.

10. Apparatus for increasing the vertical travel of auxiliary wheels mounted on an auxiliary axle according to claim 9, wherein the means for extending the locking pins and withdrawing the locking pins is a cylinder and piston assembly.

11. Apparatus for increasing the vertical travel of auxiliary wheels mounted on an auxiliary axle according to claim 10, wherein a single cylinder and piston assembly is mounted to operate locking pins at opposite ends of the auxiliary axle to lock both levers simultaneously.

12. Apparatus for increasing the vertical travel of auxiliary wheels mounted on an auxiliary axle according to claim 11, wherein the cylinder and piston assembly is supported by the pins extending from opposite ends thereof and the pins are each biased outwardly.

13. Apparatus for increasing the vertical travel of auxiliary wheels mounted on an auxiliary axle according to claim 4, wherein the levers are additionally pivotally mounted in a vertical plane at the ends of the mounting axles so that the wheels mounted on the levers can caster as the vehicle on which the axle is mounted turns.

14. Apparatus for increasing the vertical travel of auxiliary wheels mounted on an auxiliary axle according to claim 13, wherein means are provided for locking the levers when desired to prevent pivoting in the vertical plane.

* * * * *